UNITED STATES PATENT OFFICE.

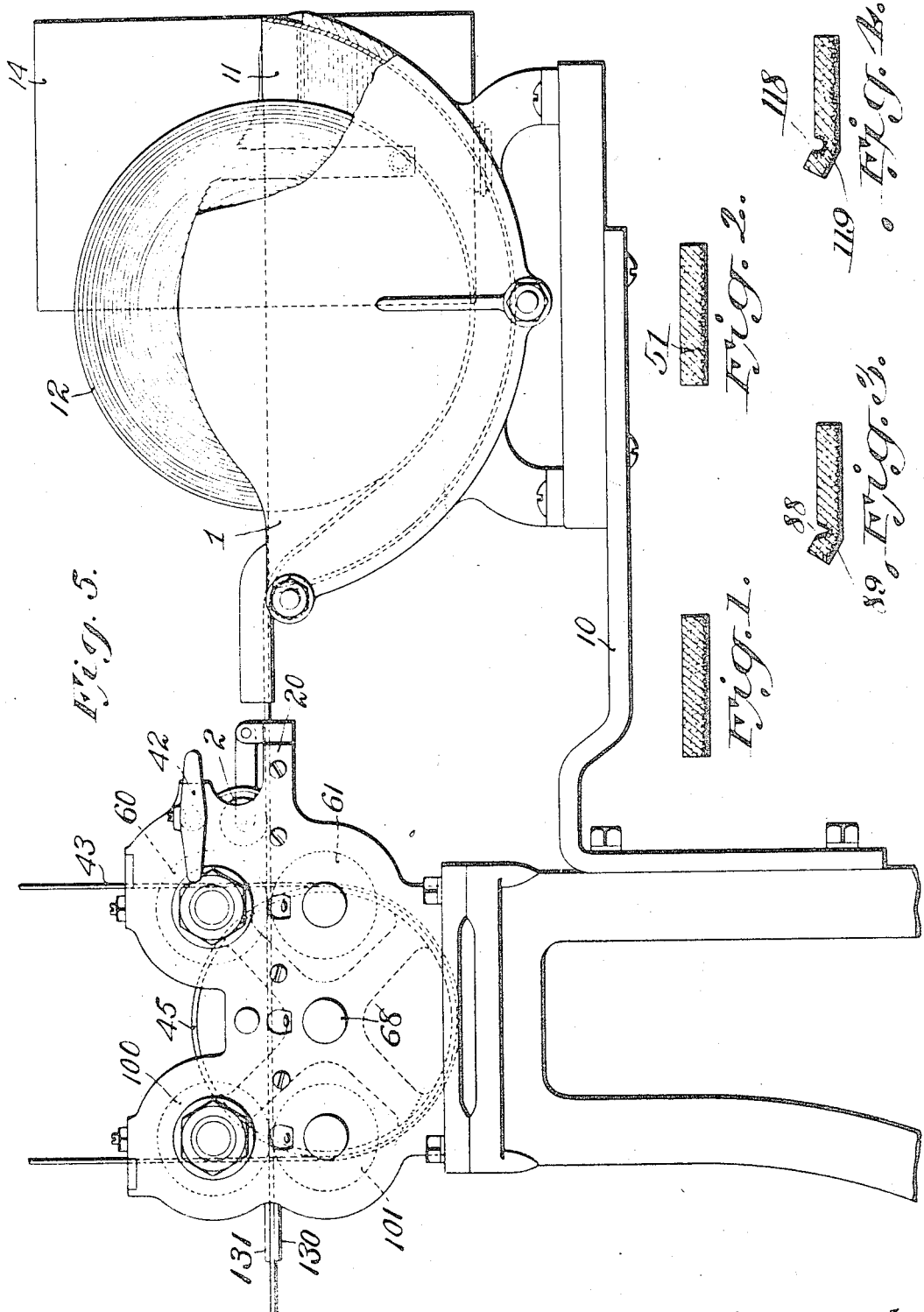

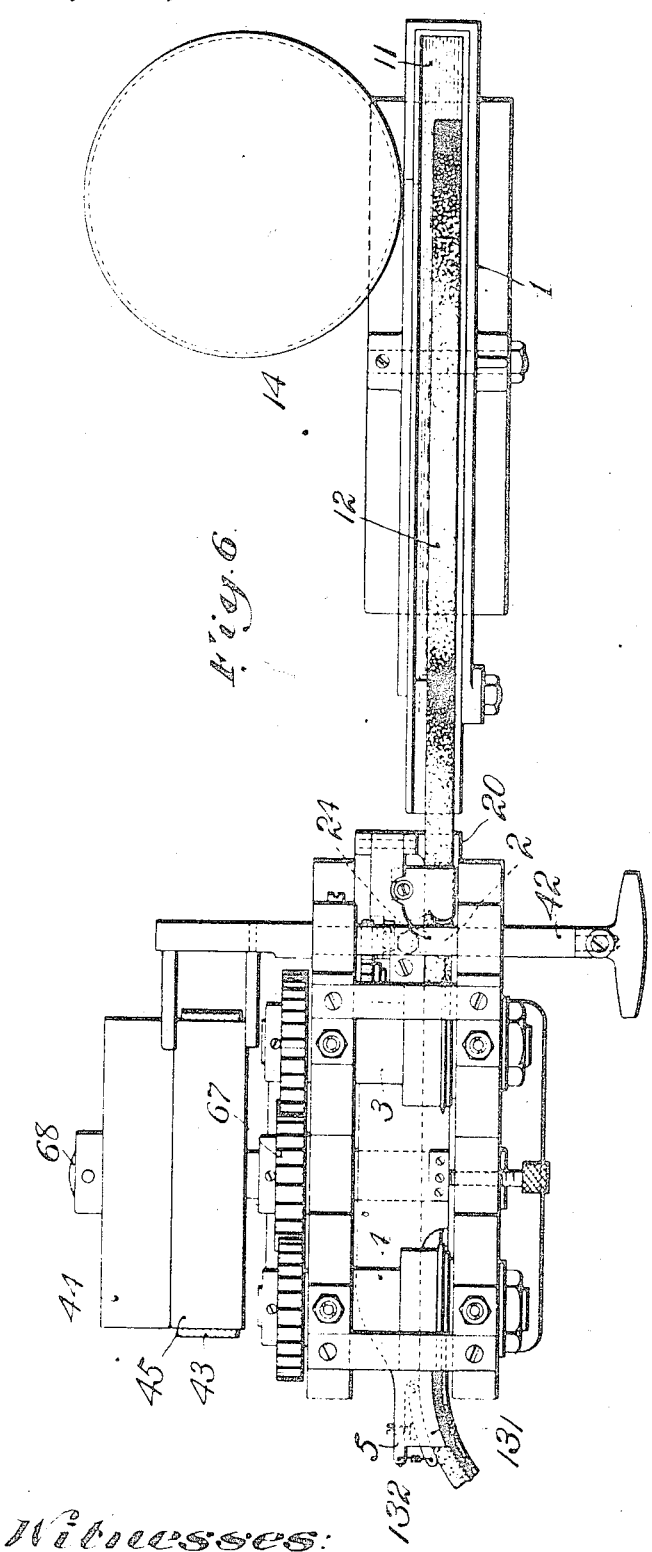

JAMES A. BROGAN, OF LAWRENCE, MASSACHUSETTS, ASSIGNOR TO UNITED SHOE MACHINERY COMPANY, OF PATERSON, NEW JERSEY, A CORPORATION OF NEW JERSEY.

METHOD FOR PREPARING A WELTING.

1,241,089.

Specification of Letters Patent. Patented Sept. 25, 1917.

Original application filed October 24, 1913, Serial No. 797,025. Divided and this application filed December 19, 1914. Serial No. 878,177.

*To all whom it may concern:*

Be it known that I, JAMES A. BROGAN, a citizen of the United States, residing at Lawrence, in the county of Essex and Commonwealth of Massachusetts, have invented certain new and useful Improvements in Methods for Preparing Weltings; and I do hereby declare the following to be a full, clear, and exact description of the invention, such as will enable others skilled in the art to which it appertains to make and use the same.

The present invention relates to an improved method for preparing a welting for use in making welt shoes.

In preparing the welting for use in making shoes known to the trade as Goodyear welt shoes, a stitch receiving groove is cut in the lower or flesh face of the leather and a bevel is cut in the inner edge of the upper or grain face of the leather. According to the general practice heretofore, the groove has been cut by means of a grooving knife which operates to remove a small, half round strip of leather from the flesh side to form the groove, and the bevel has been cut by means of a beveling knife which operates to skive off the grain surface of the leather at the inner corner. A welting thus prepared has certain disadvantages. The thin layer of grain fiber at the grain surface of the welt is the most dense and strongest part of the leather. In beveling the welt by skiving off the grain surface, the grain fiber is cut away so that the inseam, which often passes from the bottom of the groove through the skived surface of the welt, is supported only by the softer and weaker fibers forming the inner layers of the leather and it is not infrequent for the inseam to be pulled through the welt. Moreover, it often happens that in sewing the welt to the lasted shoe, the inseam will be sewed so near to the inner edge of the welt that the skived surface is partially visible in the crease between the upper and the welt. Where blacked welting is used, the appearance of the lighter colored skived leather is particularly noticeable and necessitates blackening the crease when the shoe is finished. The removal of the half round strip of material in cutting the groove, still further tends to weaken the portion of the welt which receives the inseam and allows the stitches of the inseam to be more easily pulled through the welt.

The objects of the present invention are to provide an improved method of preparing a welting which is strong and perfectly suited for welt shoe manufacturing and which will overcome the above mentioned disadvantages.

In accordance with these objects a feature of the invention contemplates the provision of an improved method of preparing a welting in which the material through which the inseam passes has been consolidated by compression. Preferably the welting is provided with a stitch receiving groove in its under face near the inner edge and with a bevel at the inner margin of its upper face and the material which has been consolidated by compression is located between the groove and the bevel. To consolidate the desired portion of the welting the stitch receiving groove or the bevel or both may be wholly or partially formed by compressing the welting. To secure the greatest degree of strength and to obviate the necessity of removing any of the grain surface of the welting, however, preferably both the groove and the bevel are formed without removing any of the material of the strip.

In addition to the features above referred to, the present invention also consists in a method of preparing a welting having certain novel features hereinafter described and claimed, the advantages of which will be obvious to those skilled in the art from the following description:

In the drawing Figure 1 is a section of a leather strip which may be used in producing a welting when treated according to the method embodying the invention.

Fig. 2 is a section of the strip after having been subjected to one of the steps of the method which may be performed upon the strip in producing the welting.

Fig. 3 is a section of the strip after being subjected to another step of the method which may be performed upon the strip in producing the welting.

Fig. 4 is a section of the completed welting after being treated according to the preferred form of the method embodying the invention.

Fig. 5 is a front elevation of a machine which may be used in the method of preparing the welting illustrated in Fig. 4.

Fig. 6 is a plan view of the machine.

Fig. 7 is a vertical section illustrating the operation of the first pair of molding rolls.

Fig. 8 is a vertical section illustrating the operation of the second pair of molding rolls.

The improved welting herein disclosed and the machine illustrated in the drawings for use in its preparation are identical with those disclosed in my copending application, Serial No. 797,025, filed October 24, 1913 of which this application forms a division.

Reference is hereby made to the above mentioned application for a detailed description of the construction and operation of parts of the machine for making my improved welting, since only a brief description of the machine is given in this application.

The welting illustrated in the drawing is made from a strip of leather of substantially rectangular cross section and having a finished grain surface as illustrated in Fig. 1. In the machine illustrated in the drawings, the strip is first softened or tempered in the moistening device 1 and is drawn past a slitting knife 2 which operates to cut a slit in its flesh face extending partially through the strip. From the slitting knife the strip passes between a pair of molding rolls indicated generally by numeral 3 which operate to open and enlarge the slit, cut by the knife and to mold the bevel on the inner margin of the grain face of the strip. From the pair of rolls 3 the strip passes to a second pair of molding rolls indicated by numeral 4 which operate to complete the enlargement of the slit into a stitch receiving groove and to complete the formation of the molded bevel on the inner margin of the strip. As the welting leaves the machine, a deflector 5 molds or bends the welting laterally toward its inner or beveled edge so that when the welting dries it retains a permanent lateral deflection or bend.

The moistening device 1 by means of which the leather is tempered or softened so that it can be easily molded is mounted on a bracket 10 at the right hand side of the machine. This moistening device consists of a water tight tank 11 in which is held the roll of welting 12 to be prepared. The water at the tank 11 is held at a constant level by a barometric tank 14. The tempered welting passes from the moistening tank over a work table 20 where it is slitted by the knife 2 to assist the pressing rolls 3 and 4 to open up and form the groove and bevel. The welt is guided and properly positioned beneath the circular slitting knife 2 by means of edge gages which may be adjusted for different widths of welting. The knife 2 is rotatably mounted on a shaft 24 connected with the main driving mechanism, by means of an Oldham coupling in such a manner that as a belt shifter 42 is operated to shift the belt 43 from the tight pulley 45, Fig. 6, to the loose pulley 44, the knife 2 is automatically raised into inoperative position so that no obstruction is left to the introduction of a fresh piece of welting, as shown in Fig. 1, into the machine. When the belt shifter 42 is moved to bring the belt 43 back to the tight pulley, the knife is automatically forced down into the welt to make the cut 51, shown in Fig. 2.

The die-rolls in forming the groove and bevel on the welt by their pressing operation serve to feed the welt through the machine. These rolls are so arranged that the slit welt of Fig. 2 passes from the knife to the first set of die-rolls 3. This set of rolls comprises an upper roll 60 and lower roll 61 splined on shafts which are so geared together that both of the rolls are positively driven at the same speed. The manner in which the rolls 60 and 61 coöperate to mold the welt is illustrated in Fig. 7. Near the forward end of the roll is an annular rib 81 which runs in and opens up the slit 51 formed by the knife 2. This rib has a substantially V-shaped cross section, the point of the V being round. At the side of the rib 81 is formed a conical or inclined forwardly facing shoulder 82 which engages the flesh face of the welt between the groove and the inner edge. By the inner edge is meant the edge of the welt which is the inner edge when it is sewed in a shoe. Beyond the conical shoulder 82 the roll is reduced to form a flat, vertical, forwardly facing shoulder 83. The lower roll 61 has a cylindrical portion 85 which bears against the grain face of the welt opposite the rib 81 and part of the shoulder 82 of the roll 60. At the front of the cylindrical portion 82 is a conical or inclined backwardly facing shoulder 86 which operates against the grain surface of the welt to bevel the inner corner of the welt. Beyond the shoulder 86, the roll is enlarged to form a vertical, flat backwardly flaring shoulder 87 which fits closely against the forwardly facing shoulder 83 of the roll 60. The tight fit between the shoulders 83 and 87 prevents the possibility of the edge of the welt being pushed forwardly beyond the inclined shoulders 82 and 86. As shown in Figs. 3 and 7, the rib 81 operates to open up or enlarge the slit 51. The rib 81 does this by compressing the leather at the sides and bottom of the slit and forms the partially completed stitch receiving groove 88, as shown in Fig. 3. The conical shoulders 86 and 82 coöperate to mold or deflect the inner edge of the welt to form the partially completed bevel 89, as shown in Fig. 3.

The welt passes from the first set of molding rolls 3 to the second set of molding rolls 4 through a welt guide which engages the welt at the front and rear edges and on top to hold the welt upon the table 20. The second pair of rolls indicated at 4 comprises an upper roll 100 and lower roll 101. These rolls are mounted similarly to the first pair of rolls. The upper roll 100, like the upper roll 60 has a rib 111, a conical shoulder 112 and a forwardly facing shoulder 113. The rib 111 is somewhat larger than the rib 81 and is substantially U-shaped in cross section. The lower roll 101, like the lower roll 61 has a cylindrical portion 115, a conical shoulder 116 and a rearwardly facing flat shoulder 117. The rib 111 operates to still further enlarge the slit formed by the knife 2 into a half round stitch receiving groove 118 as shown in Fig. 4. The conical shoulders 116 and 112 coöperate to complete the bevel 89 partially molded by the first pair of rolls and form the complete bevel 119, as shown in Fig. 4.

The welt passes from the second pair of molding rolls to a welt deflecting guide 5 which comprises bottom and top plates 130 and 131 and an adjustable back gage 132. The leather is tempered when it reaches this welt guide so that it is easily molded and retains the deflection given by the guide after it becomes dry. The welt thus transversely bent toward its inner edge, more nearly conforms to the curvature of the shoe so that it may be more easily attached to the shoe in the sewing operation, than a straight welt.

The pressing rolls and slitting knife are driven from the main shaft 68 connected with the tight pulley 45. The shaft 68 carries a spur gear 67 which actuates the gearing attached to the two sets of rolls so as to drive all of the rolls at the same speed.

The completed welt, as shown in Fig. 4, has an inseam receiving groove 118 of substantially the same form as that heretofore formed by means of a grooving knife. Instead of forming the groove by cutting out the material, the present machine operates to displace the material which was cut out by the old method, the material which is displaced from the groove being forced under pressure into the body of the welt. Instead of skiving off the material at the inner margin of the grain face, as heretofore done, this material is displaced under pressure to form the bevel. The displacement of the material at the bevel causes a consolidation of the leather and also causes the inner margin of the leather and also causes the inner margin of the leather to be displaced angularly or bent toward the flesh face of the strip. The operation of molding the groove in the welt serves to compress or consolidate under pressure the fibers of the leather thus strengthening the material forming the walls of the groove instead of weakening the welt. The action of the shoulders 86 and 116 is also to compress or consolidate the leather through which the inseam stitches pass and so strengthen it to better resist the strain of the inseam. The inner edge of the welt, which in the method of grooving and beveling heretofore employed, has been weakened by the removal of material, is, in the present invention, not weakened. As shown in Fig. 4, the grain material of the leather extends along the bevel of the extreme inner edge of the welt so that the entire face of the bevel is covered by the grain fiber of the leather. Although it may be desirable for the entire bevel to be covered with grain fiber, it is not necessary as long as the grain fiber surface of the leather extends far enough over the bevel to support the inseam. It is within the contemplation of the present invention to have the grain fiber surface extend only partially over the entire surface of the bevel. In the illustrated embodiment of the invention, the bevel 119, Fig. 4, has a flat grain surface which is inclined to the plane of the welt. The present invention, however, is not limited to its illustrated embodiment since the rolls may be so shaped that the bevel will not be flat but have various contours. The important thing is to have the inner margin of the grain side of the welt deflected toward the flesh side of the welt to form an inclined shoulder which fits against the upper of the lasted shoe at the shoulder of the insole. The term "bevel" as used in the claims is, therefore, intended to be a term of description rather than limitation and to include within its purview the shoulder on the grain surface of the welt strip whether it be a flat face like that illustrated in the drawings or of some other contour. In describing the welt, the term "upper face" is intended to refer to the face of the welt which lies uppermost and is visible in the completed shoe. The term "under face" is applied to the face of the welt which lies against the insole. The inner edge of the welt is the edge which is sewed to the upper and insole in the completed shoe.

While the preferred embodiment of the invention has been illustrated and described, it is to be understood that the present invention is not limited to its preferred embodiment but may be embodied in other constructions within the scope of the invention as set forth in the following claims:

1. The method of preparing a strip of welting for use in the manufacture of welt shoes which consists in forming a longitudinal inseam stitch-receiving groove in its under face near the inner edge, in forming a bevel at the inner margin of its upper face to fit against the shoulder of an insole, and in permanently compressing or consolidating the material between the groove and bevel through which the inseam is sewed.

2. The method of preparing a strip of welting of indefinite length for use in the manufacture of welt shoes which consists in applying pressure progressively longitudinally of the strip to mold at the inner margin of its upper face a permanent bevel to fit against the shoulder of an insole.

3. The method of preparing a strip of welting of indefinite length for use in the manufacture of welt shoes which consists in applying pressure progressively longitudinally of the strip to mold a permanent stitch receiving groove in the strip on its under face and near its inner edge.

4. The method of preparing a strip of welting of indefinite length for use in the manufacture of welt shoes which consists in applying pressure progressively longitudinally of the strip to mold a permanent stitch receiving groove in the strip on its under face and near its inner edge and to mold at the inner margin of the upper face of the strip a permanent bevel to fit against the shoulder of an insole.

5. The method of preparing a strip of welting of indefinite length for use in the manufacture of welt shoes which consists in making a cut in the under face of the strip near its inner edge of less depth than the thickness of the strip and extending longitudinally of the strip and in applying pressure progressively longitudinally of the strip to mold at said cut a permanent stitch receiving groove in the strip.

6. The method of preparing a strip of welting of indefinite length for use in the manufacture of welt shoes which consists in making a cut in the under face of the strip near its inner edge of less depth than the thickness of the strip and extending longitudinally of the strip and in applying pressure progressively longitudinally of the strip to mold at said cut a permanent stitch receiving groove in the strip and to mold at the inner margin of the upper face of the strip a permanent bevel to fit against the shoulder of an insole.

7. The method of preparing a strip of welting of indefinite length for use in the manufacturing of welt shoes which consists in molding the welting under pressure to form a longitudinal stitch-receiving groove in its under face near the inner edge and to form a bevel at the inner margin of its upper face, and in progressively deflecting or bending the welt strip laterally toward its inner edge.

8. The method of preparing a strip of welting for use in the manufacture of welt shoes which comprises forming a longitudinal stitch-receiving groove in its under face and a bevel at the inner margin of its upper face, and progressively bending the welting strip laterally toward its inner edge to form it in a shape convenient for use in shoe manufacture.

9. The method of preparing a strip of welting of indefinite length for use in the manufacture of welt shoes consisting in applying pressure progressively longitudinally of the strip to mold at its inner edge the stitch receiving parts and progressively deflecting or bending the welt strip laterally toward its inner edge.

JAMES A. BROGAN.

Witnesses:
 Geo. E. Stebbins,
 Edmund G. Borden.